Dec. 29, 1964 G. R. WEBSTER 3,163,013
STORAGE OF LOW PRESSURE GASES
Filed March 30, 1962
2 Sheets-Sheet 1

INVENTOR.
GEORGE R. WEBSTER
BY
ATTORNEY

Dec. 29, 1964  G. R. WEBSTER  3,163,013
STORAGE OF LOW PRESSURE GASES
Filed March 30, 1962  2 Sheets-Sheet 2
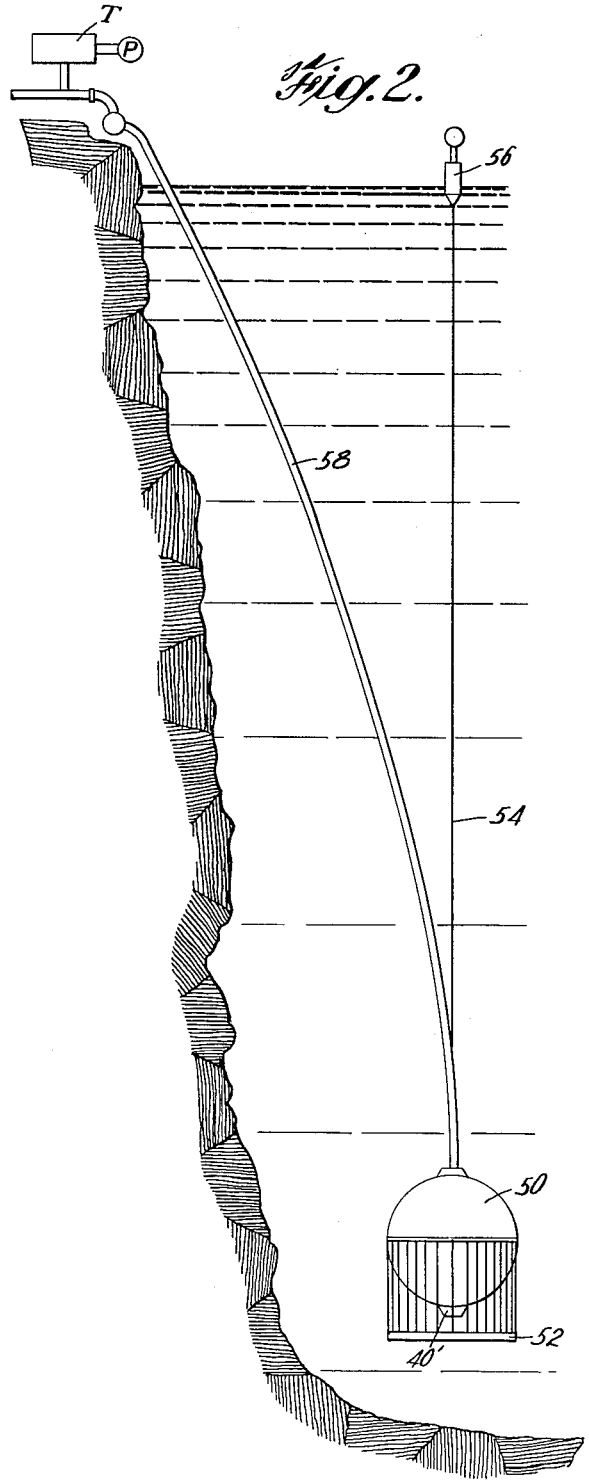
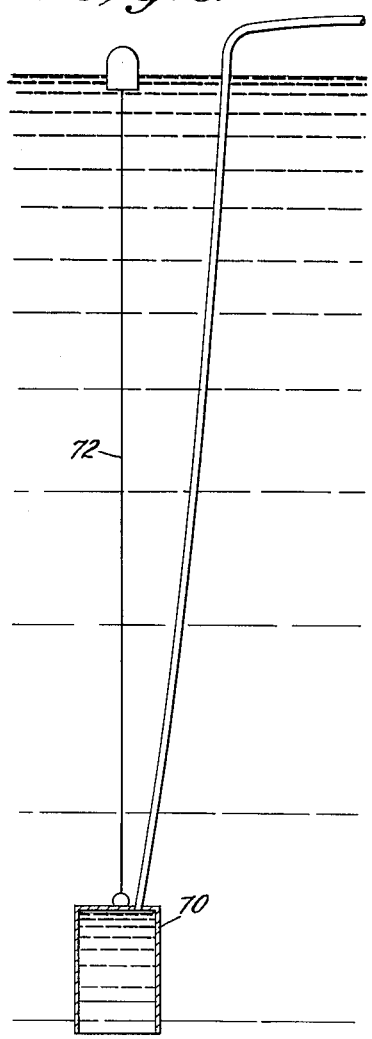
INVENTOR.
GEORGE R. WEBSTER
BY
ATTORNEY

United States Patent Office 3,163,013
Patented Dec. 29, 1964

3,163,013
STORAGE OF LOW PRESSURE GASES
George R. Webster, Princeton, N.J., assignor to Union Carbide Corporation, a corporation of New York
Filed Mar. 30, 1962, Ser. No. 183,881
4 Claims. (Cl. 62—45)

This invention relates to the storage of liquefiable gases maintained under pressure. It relates in particular to the subterranean storage of hydrocarbon and fluorocarbon gases within a sufficiently pressurized atmosphere to maintain the gas in the liquid phase.

Liquefiable hydrocarbon-type gases such as propane and butane are normally stored in bulk quantities within relatively large tanks. These tanks to be commercially practical are structurally strong enough to withstand a limited internal pressure and are generally built above ground. There are several disadvantages to this mode of gas storage included among which is the cost and maintenance of the tanks and the ever present danger of accidental explosion or fire. One way to store gases under pressure is at sufficiently low temperatures to maintain the gas in liquid state. Systems utilizing this method though require elaborate means for adequately insulating the gas storage areas and associated equipment to avoid evaporation of the liquid.

To overcome some of the primary disadvantages associated with gas storage, it has been found that underground storage under pressure conditions provides an almost unlimited spaced capacity and is also relatively safe. In order that large naturally occurring or man-made subterranean caverns and openings might be employed most beneficially, it has been suggested that the stored gas be maintained in the cavern under a pressure at least as great as the vaporization pressure of the gas at the cavern ambient temperatures. In utilizing this method however, unless adequate precautions are taken large quantities of the gas may be lost through leaking into the surrounding cavern walls.

From economic considerations, underground gas storage is highly desirable. For example, the cost for storing a single barrel of liquefiable gas above ground in a structural tank is about fifteen (15) dollars. The bulk of this figure is the cost of the tank. In marked contrast the cost of storing liquefiable gas in a subterranean cavern is about six (6) dollars a barrel, which is largely the cost of digging out the cavern.

It is, therefore, a primary object of the invention to provide an economical method and apparatus for the subterranean storage of liquefiable gases.

It is a further object to provide a method for the underground storage of such gases in a pressure responsive container surrounded by a fluid atmosphere at a sufficient pressure to maintain the gas in liquid phase.

It is another object to provide for the subterranean storage of a liquefied gas in a system of the type described, which system includes means for detecting leakage of the pressurizing fluid into the contained liquid gas.

Other objects of the invention will become apparent from the following description and accompanying drawings in which:

FIGURE 2 is an elevation view of another embodiment of the invention; and

FIGURE 3 is an elevation view of a third embodiment of the invention.

Figures 1, 1A:
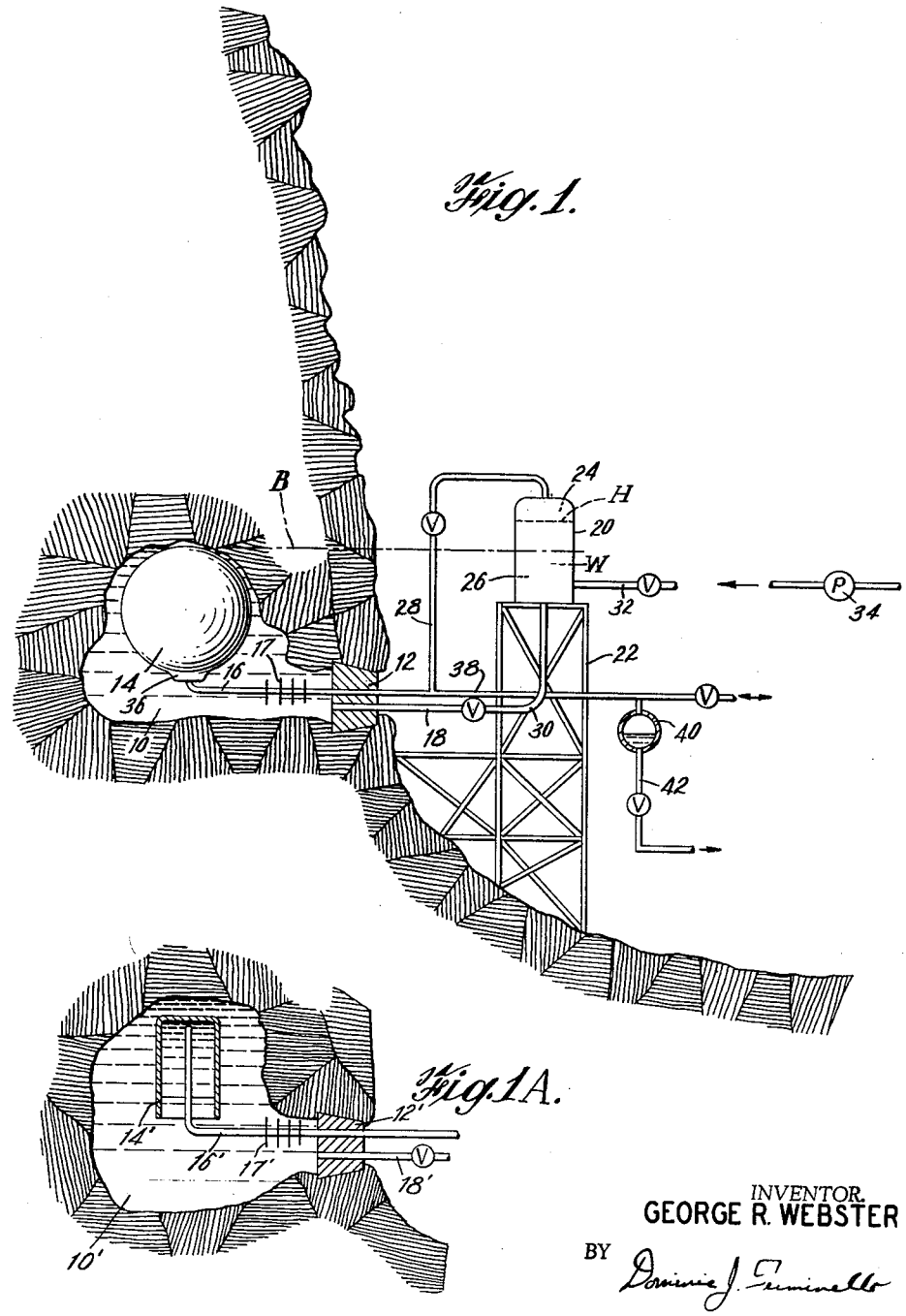
FIGURE 1 is an elevation view in partial cross-section showing an embodiment of the invention as practiced employing an underground cavern as the storage area.
FIGURE 1A is an elevation view of a modification of the embodiment shown in FIGURE 1.

In brief, the inventive method comprises providing a subterranean pressurizing cavity or storage as might be formed into the side of a hill to a sufficient depth such that the walls of said cavity are able to withstand an internal pressure at least greater than the vaporization pressure of the stored liquefied gas at the ambient temperature of the strata surrounding the cavity, thereafter providing the cavity with a supply of water or other pressurizing fluid immiscible with the stored gas so as to partially fill the cavity, also providing in the cavity and surrounded by the pressurizing fluid, a relatively thin walled flexible container for holding a supply of the liquid gas to be stored, the water in said cavity being maintained at a sufficient pressure to exert against said container a compressive force slightly greater than the pressure required to liquefy the gas, providing a plenum or pressure responsive means communicated respectively with the cavity, the container, and a supplementary water pressurizing means, and providing means for collecting water which has seeped into said container from the water filled cavity thereby affording an indication of the amount of water leakage into the flexible storage container.

For the purpose of this disclosure the term "subterranean" is used to means below the surface of the water as well as below the surface of the land.

Referring to the figures, FIGURE 1 illustrates an embodiment of a storage space presently contemplated and may consist of a cavity 10 formed into the side of a hill. The cavity itself may be formed of a natural or constructed opening such as a cave, natural underground cavern, abandoned mine or body of water. To avoid the above-mentioned wall leakage, it is desirable that the earth strata which defines the cavern be constituted of a material which will be impervious or which can be made substantially impervious to seepage of the pressurizing fluid. It is understood that the pressurizing medium may be any form of liquid so long as it is immiscible with the stored gas. For economical reasons though and for the purpose of simplifying the following description, water will be considered as the pressurizing liquid. In that the surrounding water acts as a compressive medium on the contained liquid gas, the hydrostatic pressure in the cavity 10 will at all times be maintained slightly greater than the liquefying pressure of the stored gas at the ambient temperature of the water. For example, when storing liquid propane, the cavity hydro-static pressure would be determined by the temperature of the water since the stored liquid propane and water would be in equilibrium. If this equilibrium state were 60° F., then the corresponding pressure of the propane would be about 105 p.s.i.g. or equivalent to a hydro-static head of 241 feet of water. That is to say in order to equalize the pressure of the propane the hydro-static head of the pressurizing water surrounding the stored liquid propane must be about 241 feet of water.

A further requirement for effectively using a subterranean cavity is that the walls, including the surrounding overburden, be sufficiently thick to withstand the expected internal pressure imposed thereon. Economically, it is preferred that the cavity 10 have a relatively small entrance which, as shown in FIG. 1, may be provided with closure 12 such as a concrete or a metallic slug, to form a water tight bulkhead. The cavity is provided as a practical matter with an access passage sufficiently large to accommodate a man or the materials which might be required for ordinary maintenance. Any passage of this nature is of course provided with a fluid tight manhole to maintain the container internal pressure. The cavity walls and roof may be covered with a surface layer of sealing material to fill cracks and voids depending on the condition of said walls. For example, to prevent undue abuse and attrition to a relatively thin walled gas container disposed within the cavity, the walls of the latter should be free of sharp or rough protrusions and in a reasonably smooth condition. Such a layer may be of concrete, or a suitable thermo-setting phenolic plastic material.

Referring to the embodiment of the invention illustrated in FIG. 1, the liquid gas container 14 consists of a flexible walled, inflatable receptacle made from a material which is impervious to the passage of both water and the stored liquid gas. To properly function, the container may be made from a rubber, plastic, or similar non-rigid material which is resistant to deterioration by the contained liquid. It is advantageous for installation purposes that the container be sufficiently flexible as to be rolled or folded into a compact package for insertion, either assembled or in separate parts, into the cavity 10 through a small access opening. The container shape does not constitute a major factor or limitation to the invention since its flexible nature under normal inflated conditions will permit it to conform to a certain degree with the contour of the cavity walls. Also, the liquid holding container may be inflated within a net or similar restraining means which would permit control over any movement within the cavity.

In the normal manner of practicing the invention, upon being inflated or filled with a liquid gas such as propane, the container will expand within the above-mentioned net a predetermined amount and partially fill the upper portion of the surrounding cavity 10. Prior to this inflation, it is preferred that a predetermined amount of water be pumped into the cavity such that the entire system will reach a point of pressure equilibrium when the container is filled with liquid. At this equilibrium stage, for example with water and the liquefiable gas at 60° F., the gas filled container 14 will be buoyed up against the cavity roof or the restraining net, and the surrounding pressure exerted by the water will be at a value slightly greater than about 105 p.s.i.g.

Because of the slight pressure differential existing between the contained gas and the pressurizing fluid, the container wall need only be sufficiently strong to withstand a moderate force. For example, it has been found that the container may consist of a thin walled membraneous member such as polyethylene plastic, fabricated from separate sheets to conform to the cavity upper wall. Since the stored material, as in the instance of propane will be lighter than the surrounding water atmosphere, the container filling and withdrawal means should preferably though not essentially be positioned at the container lower portion.

As shown in FIG. 1, the container is provided at its lower or under surface with coupling means for receiving a conduit 16 which transverses plug 12 at a water tight annular seal. Said conduit 16 functions as a means for both filling and emptying the container and is preferably flexibly constructed to accommodate the limited degree of movement of the container 14 within the cavity. Between the connection to container 14 and plug 12, the conduit may be provided with longitudinally spaced, outwardly projecting fins 17 or similar members for heat transfer purposes and to maintain a uniform temperature within the storage area when liquid gas is being added.

A second conduit or pipe 18 is sealably received in the plug 12 and provides communication with the cavity pressurizing medium or water portion. A plenum 20, as shown, is positioned remote to the cavity and supported on a platform 22 or similar structure built into the hill. The plenum 20 comprises in its simplest form a pressure apparatus defining an elongated chamber having vertically opposed upper and lower portions designated on the figure as 24 and 26 respectively. The upper portion 24 is communicated with the liquefied gas container 14 through conduit 16 and piping 28 to provide said upper portion 24 with liquid gas at the pressure existing within the container 14.

The lower chamber 26 is communicated through pipes 30 and 18 with the water filled cavity 10 to provide said lower portion with a continuous supply of water at the cavity pressure. A water inlet 32 also communicates the plenum lower portion 26 with a supply of make-up water for the system, fed thereto as needed by a pump 34.

The plenum 20, as illustrated in the figure, may be positioned with relation to the cavity 10 such that the plenum 20 is disposed substantially perpendicular to the horizontal plane passing through the uppermost level of the container 14.

The operation of the system shown in FIGURE 1 is as follows. As the container 14 is filled with liquefiable gas there is a pressure exerted on the walls of such container which is countered by the compressive force exerted by the surrounding water. When an essentially equilibrium condition is reached, the pressure on the container is slightly higher than the pressure exerted by the liquefiable gas tending to return to the vapor state. This difference in pressure is indicated in the plenum 20 by the difference in height between the reference level B and the level H. If for some reason the pressure in the container 14 increases, this pressure is immediately transferred to the plenum which will cause the level of the water W in the plenum to drop thereby increasing the pressure exerted by the surrounding water. If this pressure is not enough to bring about equilibrium again, supplementary pressure is supplied by pumping in more water with pump 34.

While this system may be used it is to be understood that the same result can be accomplished with suitable instruments such as gauges and regulators, etc.

In order that an accurate pressure differential may be indicated by the gas-water level in the plenum 20, such plenum and associated piping should be maintained at conditons of temperature and pressure which simulate conditions within the cavity 10. This may be accomplished by suitably insulating or providing the plenum with a controllable temperature jacket. Certain varying conditions of the atmosphere may also be compensated for by instrumentation and the usual means for establishing equilibrium conditions.

The primary purpose of establishing a higher pressure in the water portion of cavity 10 than the pressure in the container 14, is to assure that if there is any liquid flow through the container wall it will be from the surrounding water cavity into the container rather than vice versa. Since the container, although preferably liquid tight, may not be entirely impervious to water, there will be leakage into the container. This inflow, having a greater density than the contained gas, will tend to accumulate at the container's lowest point, preferably in a sump 36 provided for the purpose which is connected to and drains into conduit 16.

As previously mentioned, conduit 16 will generally lie along the cavity floor. Therefore, any excessive water accumulating in the sump 36 will flow downwardly from the container 14 and through pipe 38. The latter pipe 38 provides both inlet and outlet means for transferring liquid gas to and from the container as is required, and is preferably downwardly pitched for the length extending between plug 12 and liquid trap 40.

According to the invention, water accumulating in sump 36, conduit 16, and pipe 38 will empty into the trap 40 and thence may be directed through outlet 42. By determining and calibrating the rate at which water normally passes through trap 40 with the storage system operating, it is possible to determine the amount of make-up water which is required to fill cavity 10 and thereby adjust the flow rate at pump 34 accordingly. Therefore, the trap 40 serves two important purposes. It provides an indication of the amount of normal inleak to the container, and it also provides an instantaneous indication of the container being accidentally punctured, a happening which would provide a sharp increase in the volume of water passing through the trap.

A modification of the apparatus shown in FIGURE 1 is illustrated in FIGURE 1A. In this modification all the apparatus outside plug 12 remains the same, however, a thin-walled bell type structure 14' is built in the cavity 10' which again is filled with water. In this embodiment liquefiable gas to be stored is supplied through conduit 16' into the top of the bell 14'. As the bell is filled, the water will be displaced by the liquefiable gas and then a pressure equilibrium will be established in a manner similar to that described above.

An alternate embodiment of the invention for holding a liquefied gas is illustrated in FIG. 2. As shown, the liquid gas pressurizing medium may be a large natural body of water such as river, lake or ocean having sufficient depth to exert a liquefying pressure against the stored gas. When this system is utilized the gas storing container is lowered into the water and maintained at a predetermined depth where the ambient pressure is slightly greater than the liquefying pressure of the gas.

Specifically, the system shown in FIG. 2 consists of a flexible walled container 50 substantially as previously described, holding the stored gas in the liquid phase. A weighted carriage 52 at least partially surrounds the container and is suspended from the lower end of a cable 54. A buoy 56 or float at the cable upper end holds the container and carriage at the proper predetermined level in order that the container gas may always be in the liquid phase.

Since the stored material as previously mentioned will have a lesser density that water, there will be a tendency for the container to rise to the surface. While an anchor fastened to the carriage bottom might very well serve the desired purpose of vertically positioning container 50, the illustrated weighted carriage and supporting cable are deemed satisfactory.

Access to the container is afforded through a conduit 58 extending upwardly and communicated with a pressurized supply of the gas. Liquid propane, for example, fed into the container through conduit 58 serves as a propane leg for the system and as a means for maintaining equilibrium between the store gas and the surrounding water. In this embodiment the pressurized propane pumped into conduit 58 from tank T by the pump P supplies the additional pressure needed for maintaining equilibrium between the stored gas and the surrounding water. Also in the event of excessive leakage into the container, indicating a puncture or break in the wall thereof, the increased amount of water entering trap 40' provides an indication of such an occurrence.

Still another embodiment of apparatus falling broadly within the scope of the invention is illustrated in FIG. 3. Again, the basic principle of liquefying a gas by applying a pressure thereto is employed. As shown in FIG. 3, the gas is held within an open ended, rigid wall receptable 70 such as a bell communicated with a source of gas to be stored. The latter is positioned in a body of water, with the open end directed downwardly. Gas such as propane is then held in the liquid phase by the pressure of the surrounding water in the receptacle upper end. A support cable 72 connects the receptacle to a buoy at the water surface for adjusting the depth at which the receptacle is positoned for sustaining the liquid status of the gas.

It is readily seen that by raising or lowering the receptacle the pressurizing force against the stored liquid will be varied. Normally, when the surrounding water temperature is about 60° F., the receptacle will be maintained at a depth sufficient to maintain the gas liquid phase, and thereafter vertically adjusted to compensate for changes in water temperature.

What is claimed is:
1. Method for storing large quantities of a liquefiable gas in liquid phase and over prolonged periods of time which comprises providing a closed subterranean cavity defined by walls adapted to withstand a pressure exceeding the vaporization pressure of the gas to be stored, a portion of said cavity being occupied by a pressurizing fluid, providing said cavity with a flexible wall container holding a quantity of the gas to be stored at a sufficient pressure to maintain said gas in the liquid phase at the ambient temperature of the pressurizing fluid, communicating said container and said cavity respectively with a plenum having a pressurizing fluid containing chamber to determine the pressure differential therebetween, automatically maintaining the system in equilibrium with pressurizing fluid from said chamber in response to changes in said pressure differential, and supplying pressurizing fluid from an external source thereof to said cavity to maintain a pressure at least greater than the vaporization pressure of the gas at the ambient temperature within the cavity when there is not sufficient pressurizing fluid in said chamber.

2. System for storing large quantities of a liquefiable gas in the liquid phase and at a sufficient pressure to maintain the gas in said liquid phase over prolonged periods of time, which system comprises in combination a subterranean pressurizing means including a liquid adapted to transmit a pressure exceeding the pressure required to vaporize and maintain the stored liquefiable gas in said liquid phase at the ambient temperature existing within said subterranean means, a flexible wall collapsible container disposed within said pressurizing liquid and holding a quantity of a liquefiable gas being stored, said gas being maintained by the pressurizing means liquid at a pressure slightly greater than the vapor pressure of the gas being stored, a plenum positioned remote from said pressurizing means, said plenum being in separate communication with the pressurizing fluid and the container gas respectively to register the pressure differential therebetween and to automatically maintain equilibrium in the system.

3. System for storing large quantities of a low pressure hydrocarbon gas in the liquid phase and at a sufficient pressure to maintain the gas in said liquid phase over prolonged periods of time, which system comprises in combination a closed subterranean cavity having walls adapted to withstand an internal liquid pressure greater than the pressure required to vaporize and maintain the stored low pressure gas in said liquid phase at the ambient temperature within the cavity, said cavity being provided with only a pressurizing liquid, which is immiscible with the stored gas, a flexible wall collapsible container disposed within said cavity holding a quantity of the liquid gas being stored, said gas maintained by the pressurizing fluid at a pressure slightly greater than the liquefying pressure of the gas at the liquid ambient temperature, a plenum positioned external to said cavity having a pressurizing liquid containing chamber therein, said chamber being in separate communication with the pressurizing liquid cavity and said flexible wall gas container respectively to automatically maintain equilibrium in the system, a conduit communicated with said collapsible container to receive a flow of the pressurizing fluid resulting from leakage of said pressurizing fluid into the container, and means for adjusting the pressure on said liquid in said cavity to a value exceeding the pressure required to maintain the gas in liquid phase.

4. System for storing a low pressure hydrocarbon gas over a prolonged period of time in liquid phase and at a sufficient pressure to maintain the gas in said liquid phase, which system comprises in combination a subterranean cavity defined by enclosing walls adapted to withstand an internal fluid pressure at least slightly greater than the pressure required to maintain the stored low pressure gas in said liquid phase at the ambient temperature of the cavity, said cavity containing a pressurizing liquid immiscible with the gas, a flexible wall container within said cavity holding a quantity of the stored liquid gas, said stored gas being maintained by the surrounding liquid at a pressure slightly greater than the liquefying pressure of the gas at the liquid ambient temperature, a plenum positioned external of said cavity and having a chamber therein defined by opposed upper and lower ends, a first conduit communicating said liquid containing cavity with one end of said chamber to at least partially fill said chamber with the pressurizing fluid, a second conduit communicating the flexible wall container with the chamber other end to fill the remainder of the chamber with the liquid gas being stored, whereby said stored liquid gas and said pressurizing liquid will be in contact at a level indicating the uppermost level of the gas in said container when said water and gas are at the vaporization pressure of the gas at the ambient temperature of the cavity and whereby pressurizing fluid from said chamber is automatically supplied to said liquid containing cavity in response to changes in pressure differential therebetween to maintain equilibrium in the system, means connected with said container to receive liquid therefrom thus indicating the rate of leakage of said liquid from the cavity and into the container, and means for adjusting the pressure in said cavity to maintain said liquid at a value in excess of the said liquid gas vaporization pressure.

References Cited in the file of this patent

UNITED STATES PATENTS

| | | |
|---|---|---|
| 2,747,774 | Breitenbach | May 29, 1956 |
| 2,879,646 | Brandt | Mar. 31, 1959 |
| 2,880,593 | Johnson et al. | Apr. 7, 1959 |
| 2,938,383 | Blackburn | May 31, 1960 |
| 2,942,424 | Koble | June 25, 1960 |
| 2,947,147 | Johnson | Aug. 2, 1960 |
| 2,950,601 | Wightman | Aug. 30, 1960 |

FOREIGN PATENTS

| | | |
|---|---|---|
| 63,661 | Norway | June 30, 1941 |
| 777,644 | Great Britain | June 26, 1957 |
| 805,788 | Great Britain | Dec. 10, 1958 |